(12) United States Patent
Li et al.

(10) Patent No.: US 10,691,923 B2
(45) Date of Patent: Jun. 23, 2020

(54) FACE ANTI-SPOOFING USING SPATIAL AND TEMPORAL CONVOLUTIONAL NEURAL NETWORK ANALYSIS

(71) Applicant: Intel Corporation, Santa Clara, CA (US)

(72) Inventors: Jianguo Li, Beijing (CN); Chong Cao, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/561,958

(22) PCT Filed: Sep. 30, 2016

(86) PCT No.: PCT/CN2016/101141
§ 371 (c)(1),
(2) Date: Sep. 26, 2017

(87) PCT Pub. No.: WO2018/058554
PCT Pub. Date: Apr. 5, 2018

(65) Prior Publication Data
US 2019/0220652 A1    Jul. 18, 2019

(51) Int. Cl.
*G06K 9/00* (2006.01)
*G06F 21/32* (2013.01)
(Continued)

(52) U.S. Cl.
CPC ......... *G06K 9/00255* (2013.01); *G06F 21/32* (2013.01); *G06N 3/0454* (2013.01);
(Continued)

(58) Field of Classification Search
CPC .... G06K 9/00255; G06N 3/0454; G06T 7/20; G06T 2207/20081; G06T 2207/20084
(Continued)

(56) References Cited

U.S. PATENT DOCUMENTS

2007/0253604 A1\* 11/2007 Inoue ................. G06K 9/00221
382/118
2011/0254942 A1\* 10/2011 Suzuki ............... G06K 9/00221
348/77
(Continued)

FOREIGN PATENT DOCUMENTS

CN        103246995 A        8/2013
CN        105426723 A        3/2016
(Continued)

OTHER PUBLICATIONS

Simonyan, Karen and Andrew Zisserman, "Two-Stream Convolutional Networks for Action Recognition in Videos", arXiv: 1406.2199v2, Nov. 12, 2014, 11 pages (Year: 2014).\*
Yang, Y et al., "Learn Convolutional Neural Network for Face Anti-Spoofing", arXiv: 1408.5601v2, Aug. 26, 2014, 8 pages (Year: 2014).\*
(Continued)

*Primary Examiner* — Van D Huynh
(74) *Attorney, Agent, or Firm* — Finch & Maloney PLLC (57) ABSTRACT

Systems, apparatuses and methods may provide for detecting a facial image including generating a spatial convolutional neural network score for one or more detected facial images from a facial image detector, generating a temporal convolutional network score for detected facial video frames from the facial image detector and generating a combined spatial-temporal score to determine whether a detected facial image gains user access to a protected resource.

17 Claims, 4 Drawing Sheets

(51) Int. Cl.
*G06N 3/04* (2006.01)
*G06T 7/20* (2017.01)

(52) U.S. Cl.
CPC ...... *G06T 7/20* (2013.01); *G06T 2207/20081* (2013.01); *G06T 2207/20084* (2013.01)

(58) Field of Classification Search
USPC .......................................................... 382/118
See application file for complete search history.

(56) References Cited

U.S. PATENT DOCUMENTS

| | | | | |
|---|---|---|---|---|
| 2016/0140436 | A1* | 5/2016 | Yin | G06N 3/08 706/20 |
| 2017/0083754 | A1* | 3/2017 | Tang | G06K 9/00281 |
| 2017/0228586 | A1* | 8/2017 | Morishita | G06K 9/00288 |
| 2018/0060649 | A1* | 3/2018 | Kastaniotis | G06K 9/6256 |

FOREIGN PATENT DOCUMENTS

| | | | |
|---|---|---|---|
| CN | 105654372 A | 6/2016 | |
| CN | 105681316 A | 6/2016 | |
| WO | 2013074233 A1 | 5/2013 | |
| WO | WO-2016059786 A1 * | 4/2016 | ............... G06T 7/00 |

OTHER PUBLICATIONS

International Search Report and Written Opinion for International Patent Application No. PCT/CN2016/101141, dated Jun. 29, 2017, 11 pages.

Simonyan, Karen and Andrew Zisserman, "Two-Stream Convolutional Networks for Action Recognition in Videos", arXiv:1406.2199v2, Nov. 12, 2014, 11 pages.

Yang, Y et al., "Learn Convolutional Neural Network for Face Anti-Spoofing", arXiv:1408.5601v2, Aug. 26, 2014, 8 pages.

Maatta, J. et al., "Face Spoofing Detection From Single Images Using Micro-Texture Analysis", IEEE, 2011, 8 pages.

* cited by examiner

FACE ANTI-SPOOFING USING SPATIAL AND TEMPORAL CONVOLUTIONAL NEURAL NETWORK ANALYSIS

CROSS-REFERENCE WITH RELATED APPLICATIONS

This application is a U.S. National Phase Patent Application which claims benefit to International Patent Application No. PCT/CN2016/101141 filed on Sep. 30, 2016.

TECHNICAL FIELD

Embodiments generally relate to face detection to gain access to a protected resource. More particular, embodiments relate to face anti-spoofing using spatial and temporal convolutional neural network analysis.

BACKGROUND

Face detection may be useful in a variety of computer vision applications such as, for example, biometric verification, surveillance, video analysis, and so forth. Current face detection systems are vulnerable to "spoofing." Spoofing is an attempt by a non-authorized individual to fool a face detection system into believing that the individual is an authorized user. Spoofing may be performed using photographs, videos, or masks of an authorized user. To thwart spoofing attempts, depth information may be added to standard RGB pixels. In other instances, infrared or acoustic sensors may be used in addition to an RGB image. Nonetheless, there remains a need for improved anti-spoofing for RGB input.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
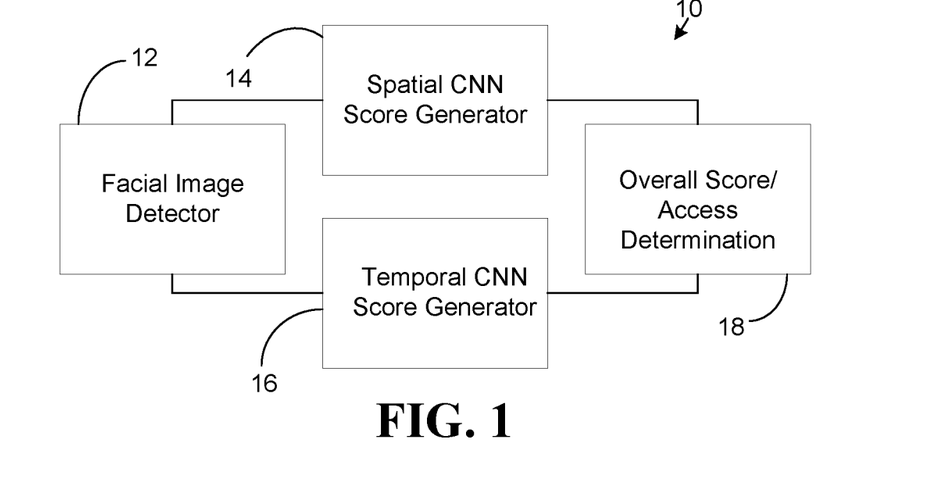
FIG. 1 is a block diagram of an example of face anti-spoofing apparatus according to an embodiment.

Turning now to FIG. 1, an anti-spoofing apparatus 10 is shown in which a facial image detector 12 detects a facial image to determine whether a user may gain access to a protected resource. A protected resource may be a computing device, a room in a building, a software program, or any other resource protected by a facial recognition apparatus. The facial image detector 12 may be an RGB image detector that can capture video as well as still images.

As will be discussed in further detail below, a detected facial image may be presented to a spatial convolutional neural network score generator 14 to determine a score that represents a probability that a detected face is a live face of an authorized user attempting to gain access to the protected resource. Similarly, a detected facial video may be processed for presentation to a temporal convolutional neural network score generator 16 to determine a score that represents a probability that a detected face is a live face of an authorized user attempting to gain access to the protected resource. The scores from the spatial convolutional neural network score generator 12 and the temporal convolutional neural network score generator 14 may be fed to an overall score generator 18 that determines whether the face presented to the facial image detector 12 is a live face that will gain user access to the protected resource.

The illustrated components of the apparatus 10 may each include fixed-functionality hardware logic, configurable logic, logic instructions, etc., or any combination thereof. Moreover, the apparatus 10 may be incorporated into a server, kiosk, desktop computer, notebook computer, smart tablet, convertible tablet, smart phone, personal digital assistant (PDA), mobile Internet device (MID), wearable device, media player, image capture device, etc., or any combination thereof. In some embodiments, the spatial convolutional neural network score generator 14 and/or the temporal convolutional neural network score generator 16 may be implemented in hardware such as a digital signal processor, a field programmable gate array, or other hardware accelerator that may be a part of a computer system such as the computer system of FIG. 5, discussed below. In other instances, the spatial convolutional neural network score generator 14 and/or the temporal convolutional neural network score generator 16 may be in the form of logic instructions that may be performed in a computer system such as the computer system of FIG. 5 or in the processor of FIG. 4.

Figure 2:
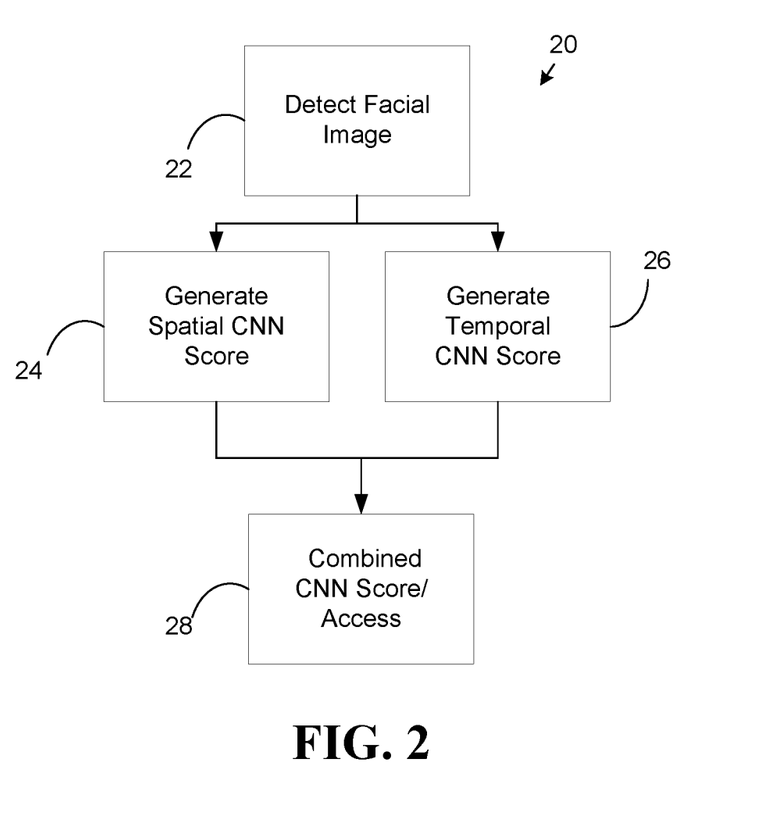
FIG. 2 is a flowchart of an example of a method of operating a facial anti-spoofing apparatus according to an embodiment.

FIG. 2 shows a method 20 of operating an anti-spoofing apparatus. The method 20 may generally be implemented in an apparatus such as, for example, the apparatus 10 (FIG. 1), already discussed, or in the processor of FIG. 4 or the computing system FIG. 5, to be discussed below. More particularly, the method 20 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 20 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 22 provides for detecting a facial image presented to a facial imaging device such as an RGB camera that is capable of collecting both still images and video images. In illustrated processing block 22, captured images may be processed for presentation to later processing blocks. In order to present a detected face to the spatial convolutional neural network score generating block 24, an RGB image detector may recognize facial landmarks and may crop face regions according to the recognized landmarks. Further, face regions may be normalized with a similarity transform.

In order to present a video sequence of a detected face to the temporal convolutional neural network score generating block 26, an RGB image detector may capture a short video sequence of a face presented to it for identification in order to access the protected resource. From the short video sequence of k frames, an optical flow may be computed for presentation to the temporal convolutional neural network score generating block 26. Optical flow represents the apparent movement of an object due to relative motion between the object and a facial image detector. For example, an image at frame time t, I(x, y; t) a pixel (x, y) moves to (x+dx, y+dy) in frame (t+1), providing the image I(x+dx, y+dy; t+1). For each pixel, the movement (dx, dy) is not identical, and is not just horizontal or vertical translation. Optical flow is the delta value of (dx, dy) for each pixel in frame t, which is itself a two channel image with dx and dy being two channels at each pixel.

Optical flow may be computed between adjacent frames. For each frame of a k frame buffer, optical flow may be computed between the $(i)^{th}$ and the $(i+1)^{th}$ frame. Corresponding facial regions in an optical flow image are cropped. For the cropped facial image regions, a similarity transform is used to normalize the optical flow images. A series of normalized optical flow images, for example, for a six-frame video, a series of {O1, O2, O3, O4, O5} images may be produced for presentation to the temporal convolutional neural network score generating block 26.

As an alternative to computing the optical flow, motion vectors from a video codec may be used as input to the temporal convolutional neural network score generating block 26.

Figure 3:
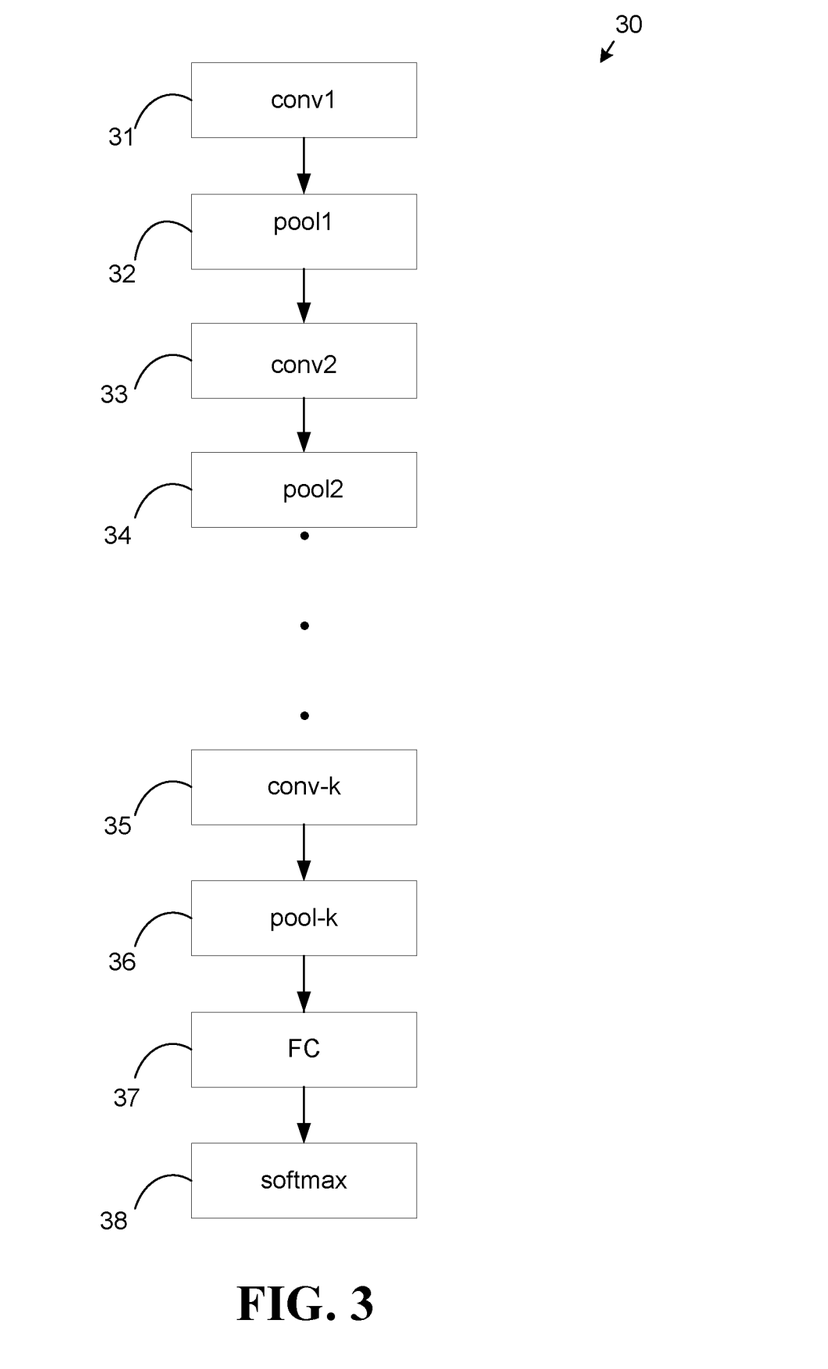
FIG. 3 is flowchart of an example of a convolutional neural network method according to an embodiment.

The processed detected facial image and facial image video are fed to the spatial convolutional neural network score generating block 24 and the temporal convolutional neural network score generating block 26. Each block subjects the input to a convolutional neural network to generate a score. An example of a convolutional neural network score generating process is depicted in FIG. 3 and may be used in each of the spatial convolutional neural network score generating block 24 and the temporal convolutional neural network score generating block 26.

As input to the first convolution layer processing block 31 "conv1," is a three channel RGB image for a single time frame or multiple channel optical flow images for several time frames from the facial detection processing block 22. For the optical flow, if three time slots are used, this will generate a six-channel input for temporal convolutional neural network processing. In processing block 31, convolution of the input images with pre-trained convolutional kernels is performed. A spatial convolution kernel may be trained by a large-scale training set. The training set may include a number of images containing actual faces and a number of spoof images based on photographs, videos, or masks. For temporal use, a pre-trained convolution kernel may be generated by a large-scale training set of optical flow images.

Convolution outputs a response map (which may also be viewed as multiple-channel images). Optical-flow for each time-frame will generate two response maps or images (one for x direction, the other for y direction).

In processing block 32, "pool1" pooling is performed. A pooling operation is similar to downsampling. That is, for each input channel it may be down-sampled to half-size, typically with a 2×2 kernel. The output of conv1 layers with max-pooling or average-pooling outputs a downsized response map.

The output of processing block 32 proceeds to a second convolution operation in block 33 "conv2." As with the first convolution operation, the input is convolved with a convolutional kernel, outputting one or more response maps. Following the second convolution, a second pooling operation is performed in processing block 34. Typically, convolution and pooling proceed until the $k^{th}$ level is reached for a convolutional neural network with k layers. With a series of convolution/pooling operations, the response map size is reduced to a very small size (for example, a size of 8×8 pixels).

Note that the difference between different convolution layers is that each convolution layer may have different input channels, output channels and kernels. For example, for a spatial convolutional neural network an input may be 128*128*3, in which 128*128 is the input image size, and 3 is the input channel number (RGB). For conv1 having a kernel of (3*3)*3*32, in which (3*3) is the convolution kernel size for each channel, and the third "3" is the input channel number (RGB), 32 is the output channel number. The first convolution will therefore produce a response map with size (128×128)*32. The operation pool1 will downsize each channel of the response map to half-size, that means, it will generate an output of (64*64)*32, in which (64*64) is the output response map size, and 32 is the output channel number.

If the second convolution has a kernel (3*3)*32*64, in which (3*3) is the convolution kernel size for each channel, 32 is the input response map channel number, 64 is the output channel number, then the second convolution will produce a response map with size (64*64)*64. The pool2 operation will downsize each channel of conv2's output to half-size, that means, it will generate output (32*32)*64, in which (32*32) is the output response map size of pool2, 64 is the number of channels.

This process repeats in successive convolution/pooling operations.

Convolution of the $k^{th}$ kernel and the $k^{th}$ pooling are respectively performed in processing blocks 35 and 36. At processing block 37, the fully connected layer "FC" receives the final pooling layer. The fully connected layer is a projection operation with equation $\hat{y}=W\hat{x}$, where $\hat{x}$ is the input vector, $\hat{y}$ is the output vector, and W is the projection matrix.

The output of the fully connected layer is input to softmax processing block 38 that provides a score to indicate whether the input image or optical flow belongs to a live authentic facial image or to a spoof image. The softmax processing block outputs a vector with two elements, in which the first element is the probability the input image/video is live authentic (e.g., the face of a live person who is an authentic user detected by the facial image detector 12) while the second element is the probability the input image/video is a spoof (e.g., the detected face is, for example, from a photograph, a video, or a mask).

The output of each softmax processing block 38 from the respective spatial convolutional neural network score generator block 24 and the temporal convolutional neural network score generator block 26 are fed to combined convolutional neural network score/access processing block 28. A vector summation is performed in processing block 28. For this summation, the output of spatial CNN processing block 24 is represented as $S_k$ and the output of temporal CNN processing block 26 is represented as $T_k$. The summation may be either a simple summation or a weighted average such as $R=bS_k+(1-b)T_k=(r_0, r_1)^T$ where b is a weight coefficient between 0 and 1 to combine $S_k$ and $T_k$. If $r_0>r_1$, then the detected facial image may be classified as a real image (e.g., the face is recognized as a live image of an authorized user) and a user may be granted access to the protected resource by processing block 28. Otherwise, the detected facial image is rejected and a user is not granted access to the protected resource.

Figure 4:
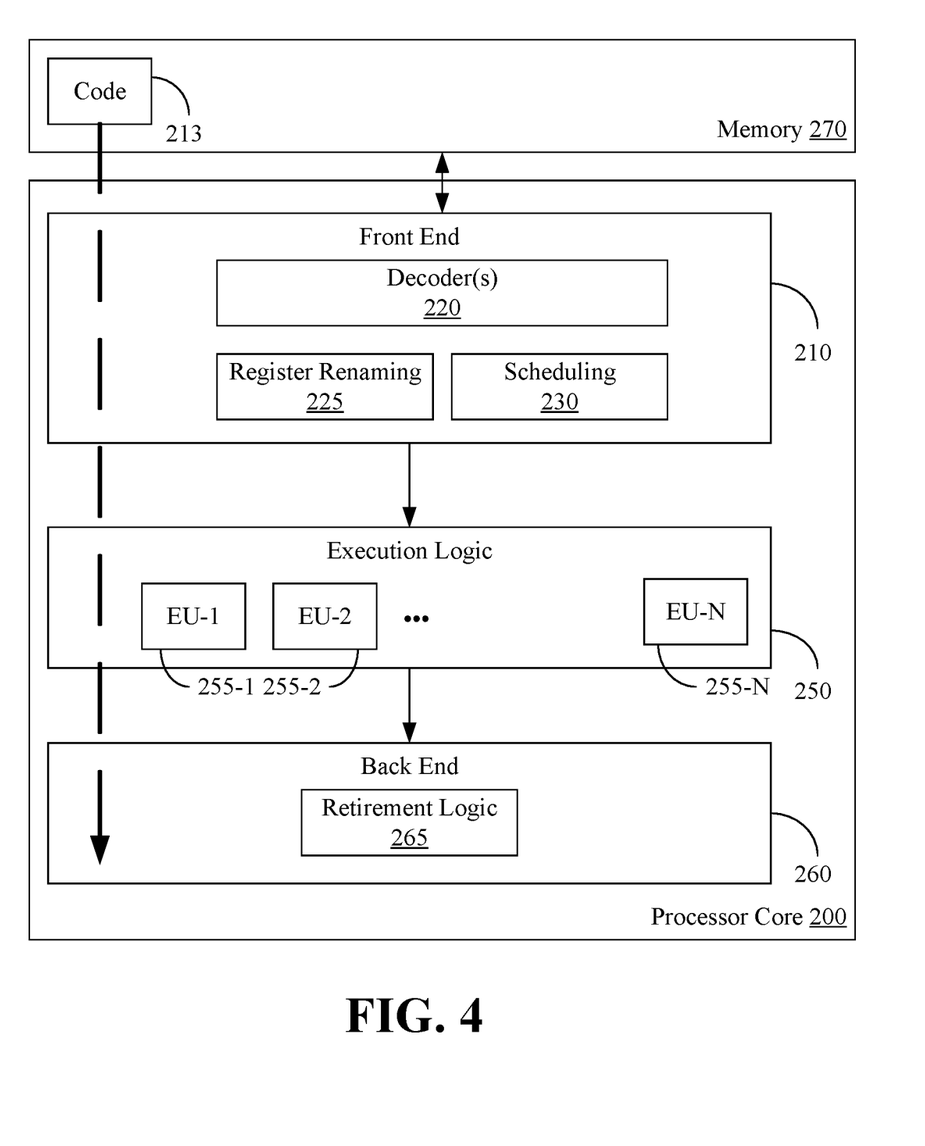
FIG. 4 is a block diagram of an example of a processor according to an embodiment.

As discussed above, the spatial CNN score generator 14, the temporal CNN score generator 16, and the overall score generator/access determination 18 may be implemented in a processor, such as a processor including the processor core of FIG. 4. FIG. 4 illustrates a processor core 200 according to one embodiment. The processor core 200 may be the core for any type of processor, such as a micro-processor, an embedded processor, a digital signal processor (DSP), a network processor, a graphics processing unit, or other device to execute code. Although only one processor core 200 is illustrated in FIG. 4, a processing element may alternatively include more than one of the processor core 200 illustrated in FIG. 4. The processor core 200 may be a single-threaded core or, for at least one embodiment, the processor core 200 may be multithreaded in that it may include more than one hardware thread context (or "logical processor") per core.

FIG. 4 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 20 (FIG. 2), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 4, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 5:
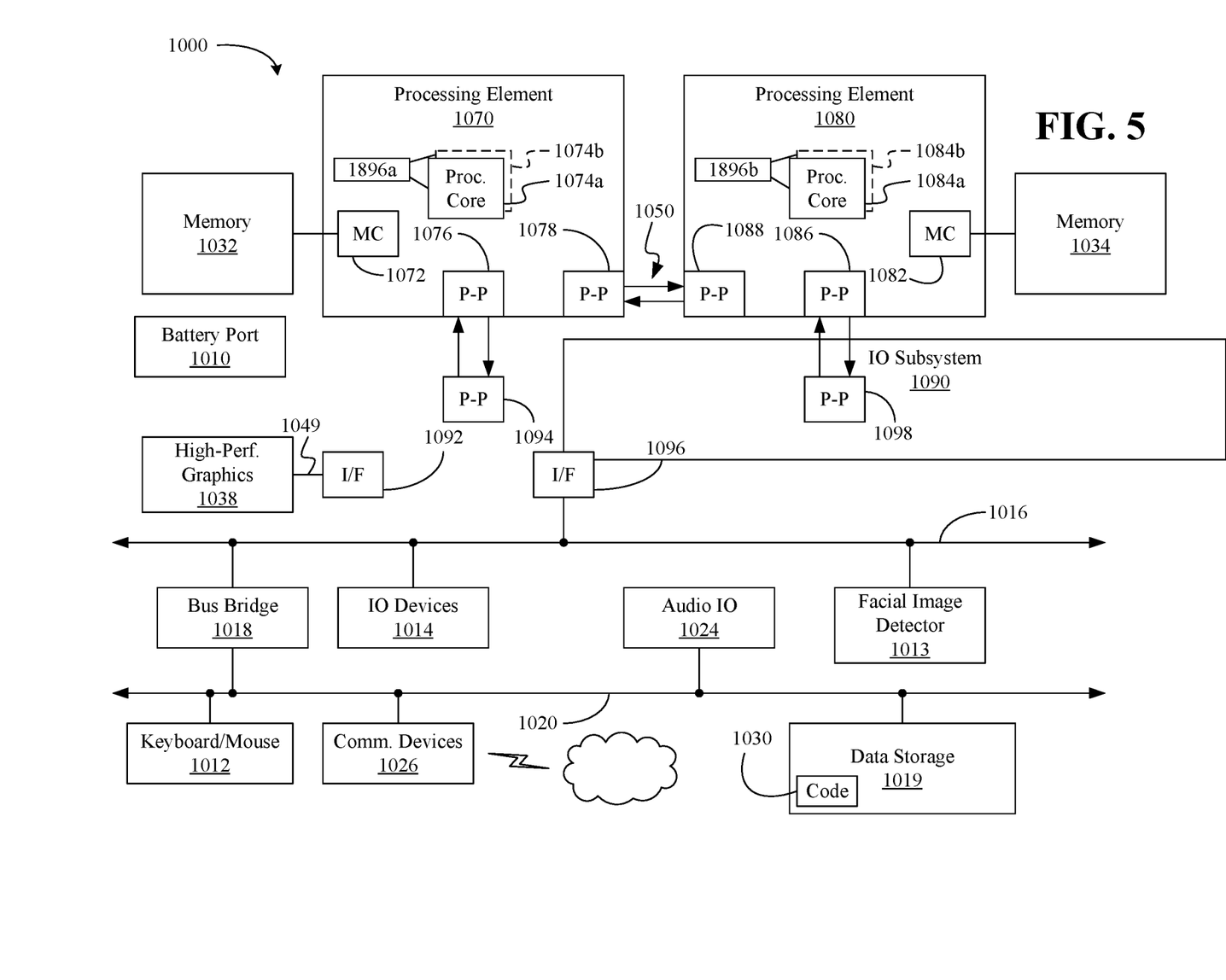
FIG. 5 is a block diagram of an example of a computing system according to an embodiment.

Referring now to FIG. 5, shown is a block diagram of a computing system 1000 in accordance with an embodiment. Shown in FIG. 5 is a multiprocessor system 1000 that includes a first processing element 1070 and a second processing element 1080. While two processing elements 1070 and 1080 are shown, it is to be understood that an embodiment of the system 1000 may also include only one such processing element. As discussed above, spatial CNN score generator 14, temporal CNN score generator 16, and overall score/access determination 18 may be part of one or both of processing elements 1070 and 1080, may be part of graphics processing engine 1038 or may be logic that it is implemented by one or more of processing elements 1070, 1080, or graphics processing engine 1038.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 5 may be implemented as a multi-drop bus rather than point-to-point interconnect.

As shown in FIG. 5, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 4.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 5, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 5, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, a facial image detector 1013 (which may be the facial image detector 12 of FIG. 1) and a data storage unit 1019 such as a disk drive or other mass storage device which may include code 1030, in one embodiment. The illustrated code 1030, which may be similar to the code 213 (FIG. 4), may implement the method 20 (FIG. 2), already discussed. Further, an audio I/O 1024 may be coupled to second bus 1020 and a battery 1010 may supply power to the computing system 1000.

Note that other embodiments are contemplated. For example, instead of the point-to-point architecture of FIG. 5, a system may implement a multi-drop bus or another such communication topology. Also, the elements of FIG. 5 may alternatively be partitioned using more or fewer integrated chips than shown in FIG. 5.

Additional Notes and Examples

Example 1 may include a facial anti-spoofing apparatus comprising a facial image detector, a spatial convolutional neural network score generator to generate a score for one or more detected facial images from the facial image detector, a temporal convolutional network score generator to generate a score for detected facial video frames from the facial image detector, and an overall spatial-temporal score generator to generate a combined spatial-temporal score to determine whether a detected facial image gains user access to a protected resource.

Example 2 may include the apparatus of example 1, wherein the protected resource is a computing device.

Example 3 may include the apparatus of example 1, wherein the temporal convolutional network score generator uses video input from the facial image detector.

Example 4 may include the apparatus of example 3, wherein the video input is processed to obtain either optical flow or motion vectors.

Example 5 may include the apparatus of example 1, wherein the combined spatial-temporal score is a two-dimensional vector.

Example 6 may include the apparatus of example 1, wherein the facial image detector is an RGB image detector.

Example 7 may include the apparatus of any of examples 1-6, wherein the spatial convolutional neural network score generator uses a pre-trained convolutional kernel on an RGB image.

Example 8 may include the apparatus of any of examples 1-6, wherein the temporal convolutional neural network score generator uses a pre-trained convolutional kernel.

Example 9 may include a method of anti-spoofing comprising detecting a facial image, generating a spatial convolutional neural network score for one or more detected facial images from the facial image detector, generating a temporal convolutional network score for detected facial video frames from the facial image detector, and generating a combined spatial-temporal score to determine whether a detected facial image gains user access to a protected resource.

Example 10 may include the method of example 9, wherein the protected resource is a computing device.

Example 11 may include the method of example 9, wherein the temporal convolutional network score generator uses video input from the facial image detector.

Example 12 may include the method of example 9, wherein the video input is processed to obtain either optical flow or motion vectors.

Example 13 may include the method of example 9, wherein the combined spatial-temporal score is a two-dimensional vector.

Example 14 may include the method of example 9, wherein the facial image detector is an RGB image detector.

Example 15 may include the method of any of examples 9-14, wherein the spatial convolutional neural network score generator uses a pre-trained spatial convolutional kernel on an RGB image.

Example 16 may include the method of any of examples 9-14, wherein the temporal convolutional neural network score generator uses a pre-trained temporal convolutional kernel.

Example 17 may include at least one computer readable storage medium comprising a set of instructions, which when executed by a computing system, cause the computing system to detect a facial image generate a spatial convolutional neural network score for one or more detected facial images from the facial image detector, generate a temporal convolutional network score for detected facial video frames from the facial image detector, and generate a combined spatial-temporal score to determine whether a detected facial image gains user access to a protected resource.

Example 18 may include the at least one computer readable storage medium of example 17, wherein the protected resource is a computing device.

Example 19 may include the at least one computer readable storage medium of example 17, wherein the temporal convolutional network score generator uses video input from the facial image detector.

Example 20 may include the at least one computer readable storage medium of example 17, wherein the video input is processed to obtain either optical flow or motion vectors.

Example 21 may include the at least one computer readable storage medium of example 17, wherein the combined spatial-temporal score is a two-dimensional vector.

Example 22 may include the at least one computer readable storage medium of example 17, wherein the facial image detector is an RGB image detector.

Example 23 may include the at least one computer readable storage medium of any of examples 17-22, wherein the spatial convolutional neural network score generator uses a pre-trained spatial convolutional kernel on an RGB image.

Example 24 may include the at least one computer readable storage medium of any of examples 17-22, wherein the temporal convolutional neural network score generator uses a pre-trained temporal convolutional kernel.

Example 25 may include a facial anti-spoofing apparatus comprising means for detecting a facial image, means for generating a spatial convolutional neural network score for one or more detected facial images from the facial image detector, means for generating a temporal convolutional network score for detected facial video frames from the facial image detector and means for generating a combined spatial-temporal score to determine whether a detected facial image gains user access to a protected resource.

Example 26 may include the apparatus of example 25, wherein the protected resource is a computing device.

Example 27 may include the apparatus of example 25, wherein the temporal convolutional network score generator uses video input from the facial image detector.

Example 28 may include the apparatus of example 25, wherein the video input is processed to obtain either optical flow or motion vectors.

Example 29 may include the apparatus of example 25, wherein the combined spatial-temporal score is a two-dimensional vector.

Example 30 may include the apparatus of example 25, wherein the facial image detector is an RGB image detector.

Example 31 may include the apparatus of any of examples 25-30, wherein the spatial convolutional neural network score generator uses a pre-trained spatial convolutional kernel on an RGB image.

Example 32 may include the apparatus of any of examples 25-30, wherein the temporal convolutional neural network score generator uses a pre-trained temporal convolutional kernel.

Thus, systems and methods described herein may improve recognition accuracy of spoofed facial images using academic spoofing benchmarks such as IDIAP (French Institut Dalle Molle d'Intelligence Artificielle Perceptive) and CASIA (Chinese Academic of Science, Institute of Automation) (with a half-total-error-rate of 1.35% and 1.8%, respectively). These results are notable as they rely solely on RGB image capture without additional parameters such as depth or infrared. The provided solutions are computationally efficient and reduce processing time and increase processing speed over other anti-spoofing techniques. The convolutional neural networks may be easily accelerated with a hardware accelerator like a GPU or a FPGA.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus for authenticating a facial image, the apparatus comprising:
   a facial image detector;
   a spatial convolutional neural network score generator to generate a first score for one or more detected facial images from the facial image detector, wherein the first score comprises a first two-dimensional vector;
   a temporal convolutional neural network score generator to generate a second score for detected facial video frames from the facial image detector, wherein the second score comprises a second two-dimensional vector; and
   an overall spatial-temporal score generator to generate a combined spatial-temporal score, based on a combination of the first and second scores, to determine whether a detected facial image gains user access to a protected resource, wherein the combined spatial-temporal score comprises a third two-dimensional vector that includes a first element and a second element, the first element indicative of a probability of the detected facial images as being attributable to an authorized user that can access the protected resource, and the second element indicative of a probability of the detected facial images as being attributable to an unauthorized user that cannot access the protected resource;
   wherein user access to the protected resource is provided in response to the first element being greater than the second element, and user access to the protected resource is denied in response to the first element being less than the second element.

2. The apparatus of claim 1, wherein the protected resource is a computing device.

3. The apparatus of claim 1, wherein the temporal convolutional neural network score generator uses video input from the facial image detector, and wherein the video input is processed to obtain either optical flow or motion vectors.

4. The apparatus of claim 1, wherein the facial image detector is a Red-Green-Blue (RGB) image detector.

5. The apparatus of claim 1, wherein:
   the spatial convolutional neural network score generator uses a pre-trained spatial convolutional kernel on a Red-Green-Blue (RGB) image; and
   the temporal convolutional neural network score generator uses a pre-trained temporal convolutional kernel on the facial video frames.

6. The apparatus of claim 1, wherein:
   the spatial convolutional neural network score generator generates the first score based on spatial features in the one or more facial images; and
   the temporal convolutional neural network score generator generates the second score based on temporal features in the facial video frames.

7. The apparatus of claim 1, wherein the combined spatial-temporal score is a weighted sum of the first score and the second score.

8. A method for authenticating a facial image, the method comprising:
   detecting a plurality of facial images;
   generating a spatial convolutional neural network score for one or more detected facial images, the spatial convolutional neural network score comprising a first two-dimensional vector;
   generating a temporal convolutional neural network score for detected facial video frames from the detected facial images, the temporal convolutional neural network score comprising a second two-dimensional vector; and
   generating a combined spatial-temporal score, based on a combination of the spatial convolutional neural network score and the temporal convolutional network score, to determine whether a detected facial image gains user access to a protected resource,
   wherein the combined spatial-temporal score comprises a third two-dimensional vector that includes a first element and a second element, the first element is indicative of a probability of the detected facial images and the facial video frames as being attributable to an authorized user who can access the protected resource, and the second element is indicative of a probability of the detected facial images and the facial video frames as being attributable to unauthorized users cannot access the protected resource,
   wherein user access to the protected resource is provided in response to the first element being greater than the second element, and user access to the protected resource is denied in response to the first element being less than the second element.

9. The method of claim 8, wherein generating the temporal convolutional neural network score uses video input from the detected facial images, the method further including processing the video input to obtain either optical flow or motion vectors, wherein the combined spatial-temporal score is a two-dimensional vector, and wherein the protected resource is a computing device.

10. The method of claim 8, wherein the detected facial images are received from a Red-Green-Blue (RGB) image detector.

11. The method of claim 8, wherein generating the spatial convolutional neural network score includes using a pre-trained spatial convolutional kernel on a Red-Green-Blue (RGB) image.

12. The method of claim 8, wherein generating the temporal convolutional neural network score includes using a pre-trained temporal convolutional kernel.

13. At least one non-transitory computer readable storage medium comprising a set of instructions, which when executed by a computing system, cause the computing system to carry out operations for authenticating a facial image, the operations including:
   detect a facial image from a facial image detector;
   generate a spatial convolutional neural network score comprising a first two-dimensional vector for one or more detected facial images from the facial image detector;
   generate a temporal convolutional neural network score comprising a second two-dimensional vector for detected facial video frames from the facial image detector; and
   generate a combined spatial-temporal score comprising a third two-dimensional vector, based on a weighted sum of the spatial convolutional neural network score and the temporal convolutional network score, to determine whether a detected facial image gains user access to a protected resource,
   wherein third two-dimensional vector includes a first element and a second element, the first element indicative of a probability of the facial image belonging to an authorized user that can access the protected resource, and the second element indicative of a probability of the facial image not belonging to any authorized user that can access the protected resource,
   wherein (i) in response to the first element being greater than the second element, user access to the protected resource is provided, or (ii) in response to the first element being less than the second element, user access to the protected resource is denied.

14. The at least one non-transitory computer readable storage medium of claim 13, wherein the protected resource is a computing device.

15. The at least one non-transitory computer readable storage medium of claim 13, wherein generating the temporal convolutional neural network score generator uses video input from the facial image detector, and wherein the video input is processed to obtain either optical flow or motion vectors.

16. The at least one non-transitory computer readable storage medium of claim 13, wherein the facial image detector is a Red-Green-Blue (RGB) image detector.

17. The at least one non-transitory computer readable storage medium of claim 13, wherein:
the spatial convolutional neural network score is generated using a pre-trained spatial convolutional kernel on a Red-Green-Blue (RGB) image; and
the temporal convolutional neural network score is generated using a pre-trained temporal convolutional kernel.

* * * * *